United States Patent
Lee et al.

(10) Patent No.: US 7,532,724 B2
(45) Date of Patent: May 12, 2009

(54) METHOD FOR ENCRYPTING AND DECRYPTING DATA FOR MULTI-LEVEL ACCESS CONTROL IN AN AD-HOC NETWORK

(75) Inventors: Kyung-hee Lee, Yongin-si (KR);
Tae-chul Jung, Seongnam-si (KR);
Evgeny Krouk, St. Petersburg (RU);
Alexey Sitalov, St. Petersburg (RU);
Sergey Bezzateev, St. Petersburg (RU)

(73) Assignee: Samsung Electronics Co., Ltd., Suwon-si, Gyeonngi-do (KR)

( * ) Notice: Subject to any disclaimer, the term of this patent is extended or adjusted under 35 U.S.C. 154(b) by 858 days.

(21) Appl. No.: 10/960,756

(22) Filed: Oct. 8, 2004

(65) Prior Publication Data

US 2005/0114660 A1 May 26, 2005

(30) Foreign Application Priority Data

Oct. 8, 2003 (KR) ............... 10-2003-0070025

(51) Int. Cl.
*H04L 9/00* (2006.01)
(52) U.S. Cl. .................................. 380/45
(58) Field of Classification Search ............ 380/45
See application file for complete search history.

(56) References Cited

U.S. PATENT DOCUMENTS

| | | | | |
|---|---|---|---|---|
| 4,322,577 A | * | 3/1982 | Brandstrom | ............ 380/37 |
| 6,367,016 B1 | * | 4/2002 | Lambert et al. | ............ 713/185 |
| 2003/0223579 A1 | * | 12/2003 | Kanter et al. | ............ 380/28 |

OTHER PUBLICATIONS

Akl and Taylor, "Cryptographic Solution to a Problem of Access Control in Hierarchy, etc . . . " vol. 1, pp. 239-248, 1983.
X. Zou, et al.—"Chinese Remainder Theorem Based Hierarchical Access, etc . . . " pp. 381-385, 2001.

* cited by examiner

*Primary Examiner*—Jacob Lipman
(74) *Attorney, Agent, or Firm*—Lee & Morse, P.C.

(57) ABSTRACT

An encryption method for encrypting data for multi-level access control in an ad-hoc network including hierarchical security classes includes encoding data into a predetermined code using a first public key of a highest security class, adding a private key of a security class to which a user belongs, to the predetermined code, and generating a ciphertext by adding a second public key, published by the security class to which the user belongs, to the addition result. A corresponding decryption method includes subtracting the private key from the ciphertext, performing a first decoding using a secret key known by a security class, to which a receiver belongs, by the receiver of the ciphertext, and correcting errors included in the second public key and detecting the data by performing a second decoding of the result of the first decoding using a code known by the security class to which the receiver belongs.

16 Claims, 4 Drawing Sheets

METHOD FOR ENCRYPTING AND DECRYPTING DATA FOR MULTI-LEVEL ACCESS CONTROL IN AN AD-HOC NETWORK

BACKGROUND OF THE INVENTION

1. Field of the Invention

The present invention relates to a method for encrypting and decrypting data for multi-level access control in an ad-hoc network. More particularly, the present invention relates to a method for encrypting and decrypting data for multi-level access control in an ad-hoc network having a hierarchy of security classes using embedded error correcting code.

2. Description of the Related Art

Access control in an ad-hoc network is performed under an assumption that information or data transmitted or stored on the ad-hoc network should be encrypted. This assumption is required because an ad-hoc network does not have an infrastructure. If such a network had an infrastructure, the ad-hoc network would be able to employ a common access control technology based on a daemon, which determines whether an arbitrary user is allowed access to protected information. However, in order to control access in an ad-hoc network without an infrastructure, all information and data should be encrypted.

To implement access control, information is encrypted, and a method for accessing the encrypted information is provided to entities having authorization to access and use the information. Generally, the access control is implemented by distributing keys to the entities and obtaining keys of dependent entities.

One conventional technology for multi-level access control is based on a discrete logarithm problem. According to this conventional technique, keys of all entities belonging to a hierarchy are dependent on each other. A size of a key increases dramatically as the number of entities increases. The advantage of this technique is that users do not need to store information on the hierarchy. Despite this advantage, this technique has a problem in that a new security class (SC) cannot be added to the hierarchy. In addition, in a lower level in the hierarchy, the size of a key becomes very large, and anonymity is not supported, since the user should publish his/her ID together with encrypted information.

Another conventional technology for multi-level access control uses Chinese Remainder Theorem (CRT). This conventional technique is based on encryption using a public key. A key used in encryption is encrypted using a public key of higher entities. The encrypted key is stored or transmitted together with encrypted information. With CRT, the hierarchical structure can be hidden. This technique needs to maintain a public key infrastructure (PKI), but the PKI is nontrivial in an ad-hoc network. In addition, the CRT calculation is for anonymity, but needs an entity referred to as a group controller, which maintains all levels. Consequently, all levels become dependent on a single entity, which complicates application to a secure ad-hoc network.

SUMMARY OF THE INVENTION

The present invention is therefore directed to a method for encrypting and decrypting data for multi-level access control in an ad-hoc network, which substantially overcomes one or more of the problems due to the limitations and disadvantages of the related art.

It is a feature of an embodiment of the present invention to provide a method for encrypting and decrypting data by which anonymity for multi-level access control is guaranteed by making a hierarchy of security classes and using embedded error correcting code.

At least the above and other features and advantages of the present invention may be realized by providing an encryption method for encrypting data in an ad-hoc network containing hierarchical security classes, the method including encoding data into a predetermined code using a first public key of a highest security class, adding a private key of a security class, to which a user belongs, to the predetermined code, and generating a ciphertext by adding a second public key, published by the security class to which the user belongs, to the addition result.

The private key may be an error vector having a weight corresponding to a level difference between a target security class, to which a user desires to transmit a message, and a security class to which the user belongs.

The second public key may be an error vector having a weight that is a number of errors that can be corrected by an error correcting code of a security class to which the user belongs.

At least the above and other features and advantages of the present invention may be realized by providing a decryption method for decrypting a ciphertext which is generated by encoding data into a predetermined code using a first public key of a highest security class in an ad-hoc network containing hierarchical security classes, adding a private key of a security class, to which a user belongs, to the predetermined code, and by adding a second public key, published by the security class to which the user belongs, to the addition result, the data decryption method including subtracting the private key from the ciphertext, performing a first decoding using a secret key known by a security class, to which a receiver of the ciphertext belongs, by the receiver of the ciphertext, and correcting an error included in the second public key and detecting the data by performing a second decoding of the result of the first decoding using a code known by the security class to which the receiver belongs.

The secret key may include a generating matrix and a permutation matrix used to generate the first public key, rows of which are removed according to a location in the hierarchy of the security class to which the receiver belongs, and a non-singular matrix used to generate the first public key.

The ciphertext may be accessible by a security class of a level that can correct a same number of errors as a sum of a number of errors contained in the private key and a number of errors corrected by the error correcting decoding.

At least the above and other features and advantages of the present invention may be realized by providing an encryption and decryption method for encrypting data and decrypting the encrypted data in an ad-hoc network containing hierarchical security classes, the method including encoding data into a predetermined code using a first public key of a highest security class, adding a private key of a security class, to which a sender belongs, to the predetermined code, generating a ciphertext by adding a second public key, published by the security class to which the sender belongs, to the addition result, subtracting the private key from the ciphertext, performing a first decoding using a secret key known by a security class, to which a receiver who received the ciphertext belongs, by the receiver who receives the ciphertext, and correcting an error included in the second public key and detecting the data by performing a second decoding of the result of the first decoding using a code known by the security class to which the receiver belongs.

In the above encryption methods, codes of respective security classes may be sequentially embedded such that a code of a higher security class is embedded in a code of a lower security class.

In the above encryption methods, an embedded code may be obtained by sequentially deleting rows from a generating matrix that generates the code of a highest security class, or by sequentially adding rows to a parity check matrix that generates the code of the highest security class.

In the above encryption methods, the first public key may be generated using a generating matrix that generates an error correcting code adopted in the highest security class.

The private key may be an error vector having a weight corresponding to a level difference between a target security class, to which the sender desires to transmit a message, and a security class to which the sender belongs.

The second public key may be an error vector having a weight that is a number of errors that can be corrected by an error correcting code of a security class to which the receiver belongs.

The secret key may include a generating matrix and a permutation matrix used to generate the first public key, rows of which are removed according to a location in the hierarchy of the security class to which the receiver belongs, and a non-singular matrix used to generate the first public key.

The ciphertext may be accessible by a security class of a level that can correct a same number of errors as a sum of a number of errors contained in the private key and a number of errors corrected by the error correcting decoding.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 3A through 3C show a key generation process according to an embodiment of the present invention.

DETAILED DESCRIPTION OF THE INVENTION

Korean Patent Application No. 2003-70025, filed on Oct. 8, 2003, in the Korean Intellectual Property Office, and entitled: "Method for Encrypting and Decrypting Data for Multi-Level Access Control in Ad-Hoc Network," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
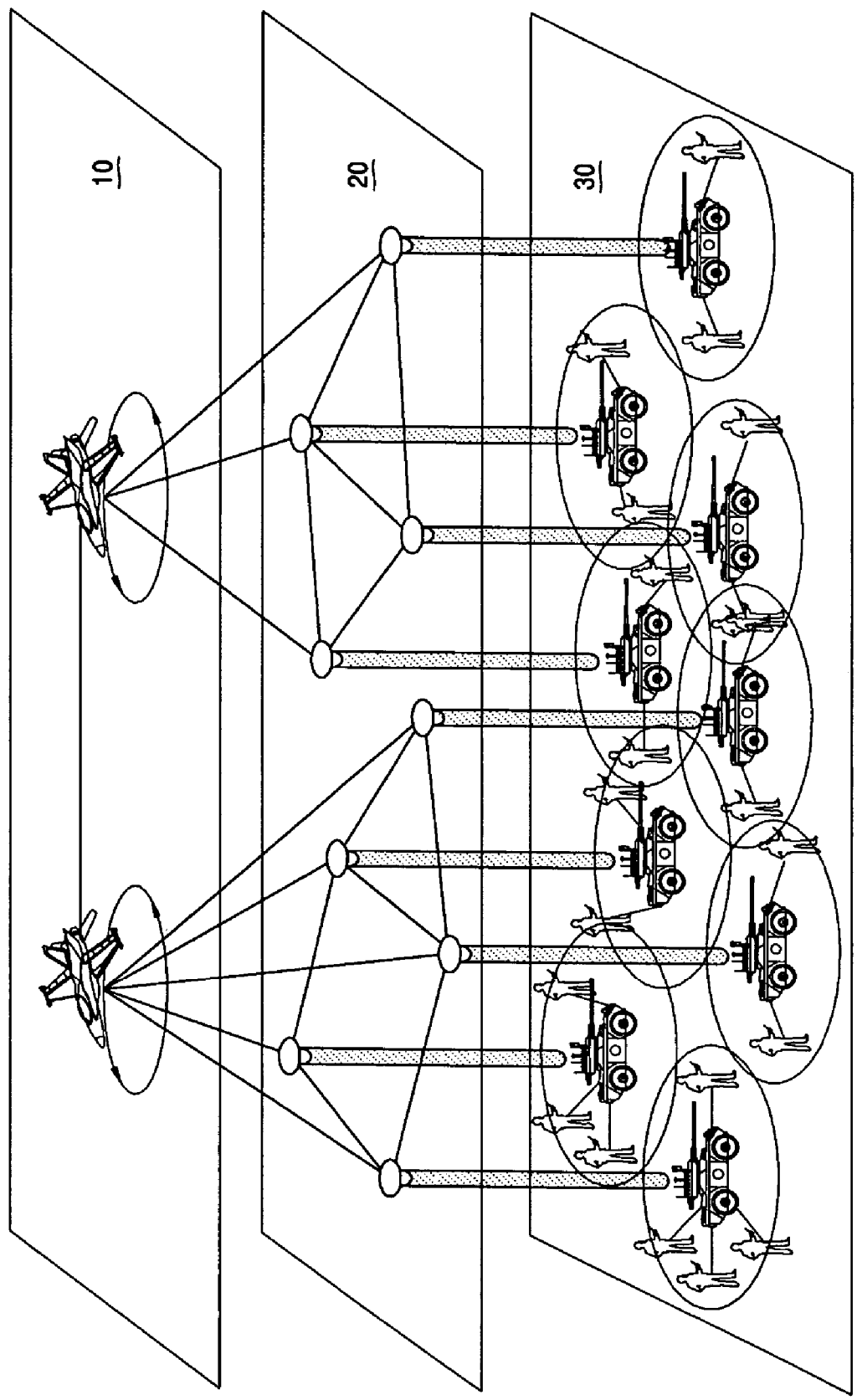
FIG. 1 is a schematic diagram of an exemplary structure of a multi-level security system in an ad-hoc network according to an embodiment of the present invention.

Referring to FIG. 1, an exemplary multi-level security system according to an embodiment of the present invention includes a first security class (SC) 10 having public mobile backbone nodes, a second SC 20 having ground mobile backbone nodes, and a third SC 30 having regular ground nodes.

The second SC 20 is lower than the first SC 10 and higher than the third SC 30. Accordingly, the backbone nodes of the first SC 10 can access and control the backbone nodes of the second SC 20, and the backbone nodes of the second SC 20 can access and control the nodes of the third SC 30.

Figure 2:
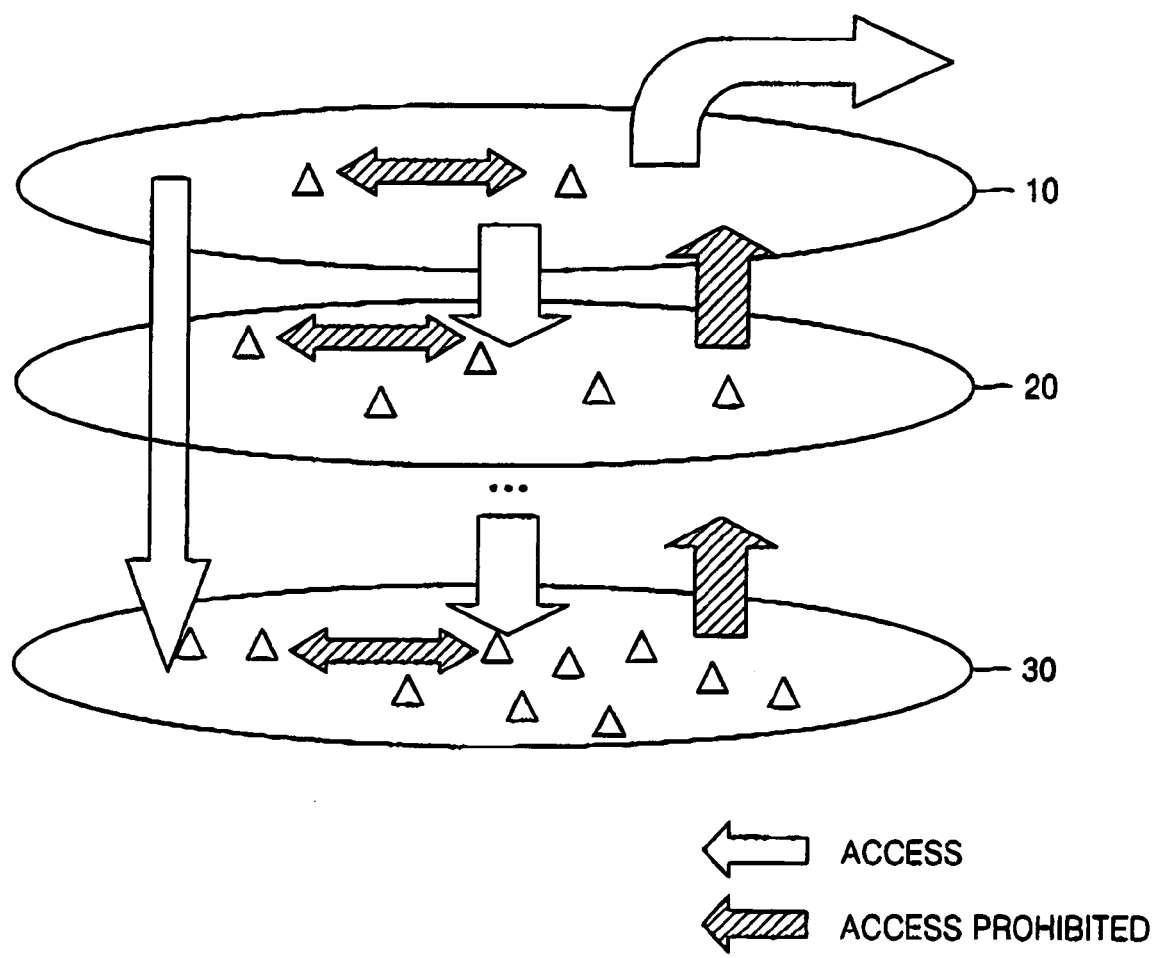
FIG. 2 is a conceptual diagram of accessibility between levels in the hierarchical structure shown in FIG. 1.

FIG. 2 is a conceptual diagram of accessibility between levels in the hierarchical structure shown in FIG. 1. According to FIG. 2, a higher SC 10 and 20 can access a lower SC 20 and 30, respectively, but a lower SC 20 and 30 cannot access a higher SC 10 and 20. The highest SC 10 can directly access the lowest SC 30. Nodes in each SC cannot access each other. The highest SC 10 can be connected to another multi-level security system.

In an embodiment of the present invention, an error correcting code is used for encrypting information for access control in the hierarchical SCs as described above. The error correcting code requires three parameters of length n, dimension k and shortest distance r=n−k. In order to express SCs of each level, a concept of embedded code will be introduced in the present invention. Embedded code means, for example, that code $C_0$ is embedded in code $C_1$, and all codewords of $C_0$ are included in $C_1$, but the inverse is not true. Accordingly, a code with (n, k, d) parameters will have (n, k−k1, d+d1) parameters (where, k1 and d1 are natural numbers). That is, a size of information to be encrypted decreases and a shortest length of an SC code increases such that an error correcting capability increases as compared to that of the original code. The process for generating an embedded code is referred to as expurgation. Expurgation is performed by sequentially deleting rows from a generating matrix when an error correcting code is defined by the generating matrix, or by adding rows of a parity check matrix when an error correcting code is defined by the parity check matrix.

Figures 3A, 3B, 3C:
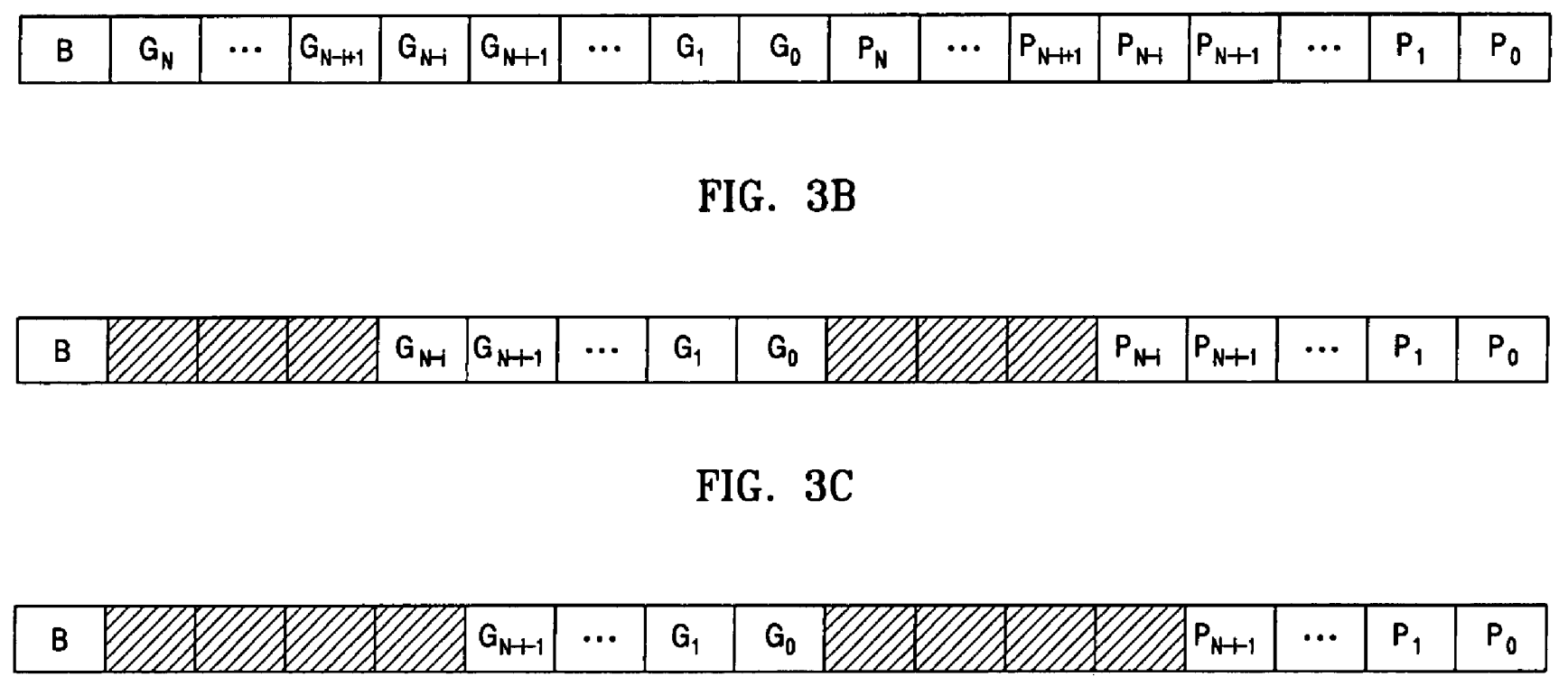

FIGS. 3A through 3C show a key generation process according to an embodiment of the present invention. According to FIGS. 3A through 3C, the highest SC has an error correcting code as shown in FIG. 3A, and in particular, system public key G'=BGP wherein G is a generating matrix for Goppa code, P is a permutation matrix, and B is a non-singular matrix operating as a scrambler.

Each SC has a corresponding error correcting code, and in particular, a private key that is a random error vector having a weight (wt) that is a number $t_j$ of errors that can be corrected by Goppa code. The private key of each SC is published.

In addition, each SC may have parts of G, P, and M as a secret key as shown in FIGS. 3B and 3C. For example, an i-th SC may have a secret key formed with B, $\{G_{N-i}, G_{N-i-1}, \ldots, G_1, G_0\}$, and $\{P_{N-i}, P_{N-i-1}, \ldots, P_1, P_0\}$, as shown in FIG. 3B, and an (i+1)-th SC may have a secret key formed with B, $\{G_{N-i-1}, G_{N-i-2}, \ldots, G_1, G_0\}$, and $\{P_{N-i-1}, P_{N-i-2}, \ldots, P_1, P_0\}$, as shown in FIG. 3C.

A user of each SC has an additional secret key, which is used to send a message to any one of the SCs higher than the SC to which the user, i.e., the sender, belongs. This additional secret key is a secret error vector, and wt applied to this error vector is the same as a difference between the error correcting capability of the higher SC and the error correcting capability of the SC to which the sender belongs. Here, the weight means a number of non-zero elements of an error vector. A number of these additional secret keys is the same as the number of SCs higher than the SC to which the sender belongs. These secret keys can be easily changed during operation.

An embedded code can be generated using Goppa code that is one of the error correcting codes. Goppa code $\Gamma(L, g)$ is defined as the following equation (1):

$$\Gamma(L, g) = \{c \in GF(q)^n : R_c(x) \equiv 0 \mod g(x)\} \quad (1)$$

$$R_c(x) = \sum_{i=1}^{n} \frac{c_i}{x - \alpha_i}$$

where L is a locator set and g(x) is a Goppa polynomial. $GF(q)^n$ is a finite field $GF(2^n)$ containing $q^n$ elements, and mod is a modular operator. In addition, $\alpha_i$ is an integer and n is a natural number.

Assuming that code $\Gamma_1(L, g_1)$ is defined by Goppa polynomial $g_1(x)$, $g_0(x)$ to generate embedded code $\Gamma_0(L, g_0)$ can be formed by selecting a polynomial that can be divided by $g_1(x)$. In the same manner, a code corresponding to each SC can be generated by selecting polynomials for hierarchical SCs.

Since the highest SC has a code embedded in all other codes, other SCs are arranged according to the error correcting capability of the highest SC code. Consequently, the highest SC has the maximum error correcting capability.

The public key of the highest SC is used for encryption. The codes of other SCs are generated using their own private keys, and the code of a higher SC should be included in a code of a lower SC.

Figure 4:
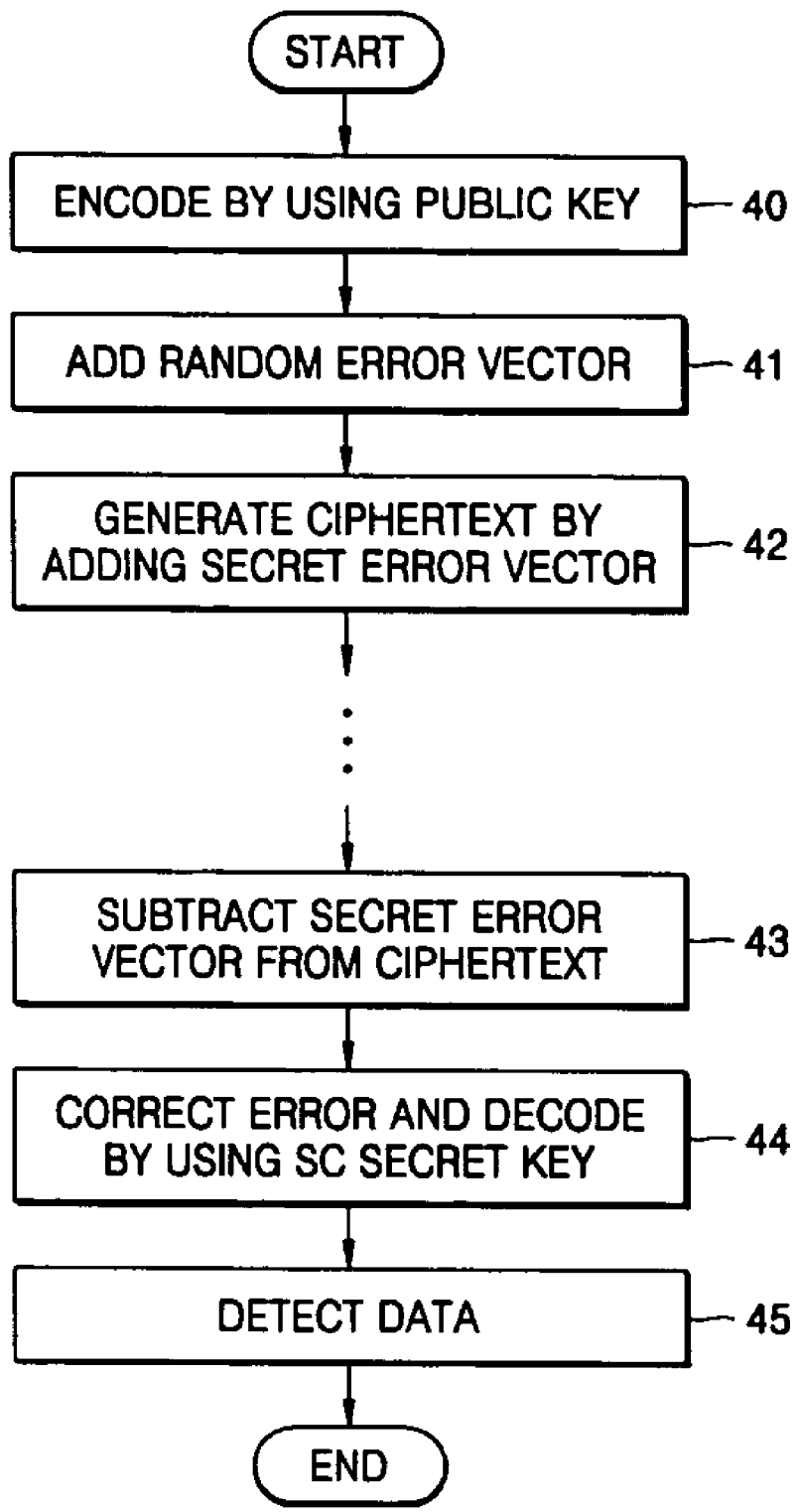
FIG. 4 is a flowchart illustrating a process for encryption and decryption according to an embodiment of the present invention.

A user of each class encrypts data and decrypts the encrypted data using an appropriate key. FIG. 4 is a flowchart illustrating a process for encryption and decryption according to an embodiment of the present invention. The encryption process as shown in FIG. 4 will now be explained.

In step 40, an i-th user, i.e., a sender, belonging to a j-th SC encodes information vector m, using public key G' based on error correcting code $C_0$. In step 41, random error vector f whose wt is $t_j$, as a private key of the SC to which the sender belongs, is added to the encoded information vector, and by adding secret error vector $e_i$ that is a secret key of the i-th user's, in step 42, ciphertext b is generated as the following equation (2):

$$b = c + e_i + f \quad (2)$$

where, $wt(e_i+f) = wt(e_i) + t_j = t_a$.

A ciphertext corresponding to equation (2) can be accessed by all users belonging to SCs having t greater than or equal to $t_a$. Accordingly, if a user, i.e., a receiver, belonging to an SC higher than the SC to which the ciphertext writer belongs, desires to access this ciphertext, the receiver should have a secret error vector with a weight corresponding to the ciphertext. That is, a receiver belonging to the i-th SC further selects secret error vector $e_i$ that satisfies $wt(e_i) + t_j \leq t_{i-1}$ for the number $t_{i-1}$ of errors that can be corrected in the (i−1)-th SC, which is a higher SC than the i-th SC. Thus, the ciphertext is accessible by a security class of a level that can correct a same number of errors as a sum of a number of errors contained in the private key and a number of errors corrected by the error correcting decoding. Recursively, a user of the i-th SC generates a subsecret for a user of the (i+1)-th SC.

In order to decrypt the ciphertext corresponding to equation (2), in step 43, an authorized user, i.e., the receiver, subtracts $e_i$ from the ciphertext using a secret key, and using SC secret keys based on code $C_i$, in step 44, corrects $t_j$ errors and performs decoding, and, in step 45, detects information vector m.

According to an embodiment of the present invention, a ciphertext is made by adding a code of a highest class and a plurality of errors corresponding to a target SC to which a user (i.e., the sender) desires to send a message, and an authorized user (i.e., the receiver) corrects errors and performs decoding using his/her own code such that anonymity is guaranteed. In addition, the sender's own ID is not disclosed in encrypted information such that the hierarchical structure can be hidden.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An encryption method for encrypting data in an ad-hoc network containing at least two hierarchical security classes, the method comprising:

encoding data into a predetermined code using a public key of a first security class, which is a highest security class of the at least two hierarchical security classes;

adding a private key of a second security class to which a user belongs, the second security class being lower than the first security class, to the predetermined code, so as to form an addition result; and generating a ciphertext by adding a secret key of the user to the addition result, so as to form the ciphertext, wherein:

predetermined codes of respective security classes are sequentially embedded such that a higher predetermined code of a higher security class of the at least two hierarchical security classes is embedded in a lower predetermined code of a lower security class of the at least two hierarchical security classes.

2. The method as claimed in claim 1, wherein the lower predetermined code is obtained by sequentially deleting rows from a generating matrix or by sequentially adding rows to a parity check matrix, both the generating matrix and the parity check matrix being used to generate the predetermined code of the first security class.

3. The method as claimed in claim 1, wherein the public key is generated using a generating matrix that generates an error correcting code of the first security class.

4. The method as claimed in claim 3, wherein the private key is an error vector having a weight corresponding to a level difference between a target security class to which a user desires to transmit a message and the second security class.

5. The method as claimed in claim 3, wherein the secret key is an error vector having a weight that is a number of errors that can be corrected by an error correcting code of the second security class.

6. A decryption method for decrypting a ciphertext generated by encoding data into a predetermined code using a public key of a first security class, which is a highest security class in an ad-hoc network containing at least three hierarchical security classes, adding a private key of a second security class to which a sender belongs, the second security class being lower than the first security class, to the predetermined code, and adding a secret key of the sender, so as to form the ciphertext, the data decryption method comprising:

subtracting a private key of a third security class to which a receiver belongs, the third security class being higher than the second security class, and a secret key of the receiver from the ciphertext to generate a predetermined code; and detecting the data by decoding the predetermined code using a public key of the third security class.

7. The method as claimed in claim 6, wherein the secret key comprises a generating matrix and a permutation matrix used to generate the public key having rows removed according to a location in the hierarchy of the third security class, and a non-singular matrix used to generate the public key.

8. The method as claimed in claim 6, wherein the ciphertext is accessible by a security class of a level that can correct a same or more number of errors as a sum of a number of errors contained in the private key of the second security class and a number of errors corrected by the decoding.

9. An encryption and decryption method for encrypting data and decrypting the encrypted data in an ad-hoc network containing at least three hierarchical security classes, the method comprising:

encoding data into a predetermined code using a public key of a first security class, which is the highest security class of the at least two hierarchical security classes;

adding a private key of a second security class to which a sender belongs, the second security class being lower than the first security class, to the predetermined code, so as to form an addition result;

generating a ciphertext by adding a secret key of the sender to the addition result, so as to form the ciphertext;

sending the ciphertext to a receiver;

subtracting a private key of a third security class to which the receiver belongs, the third security class being higher than the second security class, and a secret key of the receiver from the ciphertext to generate a predetermined code; and detecting the data by decoding the predetermined code using a public key of the third security class.

10. The method as claimed in claim 9, wherein the secret key comprises a generating matrix and a permutation matrix used to generate the public key having rows removed according to a location in the hierarchy of the third security class, and a non-singular matrix used to generate the public key.

11. The method as claimed in claim 9, wherein the ciphertext is accessible by a security class of a level that can correct a same or more number of errors as a sum of a number of errors contained in the private key of the second security class and a number of errors corrected by the decoding.

12. The method as claimed in claim 9, wherein predetermined codes of respective security classes are sequentially embedded such that a higher predetermined code of a higher security class of the at least three hierarchical security classes is embedded in a lower predetermined code of a lower security class of the at least two hierarchical security classes.

13. The method as claimed in claim 12, wherein the lower predetermined code is obtained by sequentially deleting rows from a generating matrix or by sequentially adding rows to a parity check matrix, both the generating matrix and the parity check matrix being used to generate the predetermined code of the first security class.

14. The method as claimed in claim 12, wherein the public key is generated using a generating matrix that generates an error correcting code of the first security class.

15. The method as claimed in claim 14, wherein the private key is an error vector having a weight corresponding to a level difference between a target security class to which a user desires to transmit a message and the second security class.

16. The method as claimed in claim 14, wherein the secret key is an error vector having a weight that is a number of errors that can be corrected by an error correcting code of the second security class.

* * * * *